(12) United States Patent
Bailey et al.

(10) Patent No.: US 11,912,082 B1
(45) Date of Patent: Feb. 27, 2024

(54) BRAKE AND COMMUNICATION SYSTEM TO TRANSFER CONTROL SIGNALS AND DATA BETWEEN A TOWING VEHICLE AND A TOWED VEHICLE

(71) Applicants: David F. Bailey, Riverview, FL (US); Russell Creed, West Hartford, CT (US)

(72) Inventors: David F. Bailey, Riverview, FL (US); Russell Creed, West Hartford, CT (US)

(73) Assignee: CREED 2.0 LLC, New Britian, CT (US)

( * ) Notice: Subject to any disclaimer, the term of this patent is extended or adjusted under 35 U.S.C. 154(b) by 253 days.

(21) Appl. No.: 17/300,458

(22) Filed: Jul. 6, 2021

Related U.S. Application Data

(60) Provisional application No. 63/102,918, filed on Jul. 9, 2020.

(51) Int. Cl.
| | |
|---|---|
| *B60D 1/62* | (2006.01) |
| *B60T 8/17* | (2006.01) |
| *B60T 7/20* | (2006.01) |
| *B60T 8/32* | (2006.01) |

(52) U.S. Cl.
CPC ............... *B60D 1/62* (2013.01); *B60T 7/20* (2013.01); *B60T 8/1708* (2013.01); *B60T 8/323* (2013.01)

(58) Field of Classification Search
CPC ... B60D 1/62; B60T 7/20; B60T 8/323; B60T 8/1708
USPC .......................................................... 303/7
See application file for complete search history.

(56) References Cited

U.S. PATENT DOCUMENTS

| | | | |
|---|---|---|---|
| 6,609,766 B1* | 8/2003 | Chesnut ................ | B60T 11/107 188/3 R |
| 9,738,125 B1* | 8/2017 | Brickley ................. | B60D 1/62 |
| 2004/0090114 A1* | 5/2004 | Macnamara .......... | B60T 17/221 303/118.1 |
| 2006/0214506 A1* | 9/2006 | Albright ................... | B60T 7/20 303/123 |
| 2007/0001509 A1* | 1/2007 | Brown .................... | B60K 35/00 303/123 |
| 2008/0257656 A1* | 10/2008 | Skinner ............. | H04B 10/1121 188/1.11 E |

(Continued)

*Primary Examiner* — Robert A. Siconolfi
*Assistant Examiner* — San M Aung
(74) *Attorney, Agent, or Firm* — Arthur W. Fisher, III

(57) ABSTRACT

A brake and communication system to remotely control the braking of a towed vehicle from a towing vehicle comprising a towing vehicle module including a microcontroller having logic and circuitry to generate a braking signal in response to braking of said towing vehicle fed through an automotive vehicle self-diagnostic device port and vehicle control unit interface to the brake system of the towed vehicle and the towed vehicle includes a microcontroller having logic and circuitry to generate a brake control signal fed to the brake system of the towed vehicle through a vehicle control unit interface and automotive self-diagnostic port to electronically actuate the towed vehicle brakes and to transfer data between said towing vehicle and the towed vehicle including information of selected vehicle control network operating parameters generated in the towed vehicle through said microcontroller to a remote monitor or display in said towing vehicle to show and to alert the driver of said towing vehicle of the status of selected operating parameters of the towed vehicle when in tow.

22 Claims, 14 Drawing Sheets

(56) References Cited

U.S. PATENT DOCUMENTS

| | | | |
|---|---|---|---|
| 2010/0152920 A1* | 6/2010 | McCann | B60T 7/20 701/2 |
| 2010/0222979 A1* | 9/2010 | Culbert | B60T 7/20 701/70 |
| 2013/0238205 A1* | 9/2013 | Edwards | B60T 7/12 74/108 |
| 2018/0079395 A1* | 3/2018 | Cekola | B60T 8/1708 |

* cited by examiner

FIG. 12

Brake Flow Chart

BRAKE AND COMMUNICATION SYSTEM TO TRANSFER CONTROL SIGNALS AND DATA BETWEEN A TOWING VEHICLE AND A TOWED VEHICLE

CROSS-REFERENCE

This is a utility patent application claiming priority of provisional application No. 63/102,918 filed Jul. 9, 2020.

BACKGROUND OF THE INVENTION

Field of the Invention

A brake and communication system to remotely control the braking of a towed vehicle by a towing vehicle and to transfer information between said towing vehicle and the towed vehicle.

Description of the Prior Art

Often recreational vehicles, motor homes, trucks, and the like tow a smaller vehicle hitched thereto. The combined weight of said towing vehicle and towed vehicle creates a dangerous braking condition when using only the towed vehicle brake system.

This increased mass impacts both the stopping distances and time, as well as creates excessive wear on the brakes of said towing vehicle. Further, the mechanical connection between said towing vehicle and the towed vehicle is overly stressed.

Furthermore, ABS systems present a contamination problem when being towed. These ABS systems are rendered inoperative when the fluid level decreases. As such, these ABS brake systems can cause faults in their computer programs and operation of the brake and traction systems.

The prior art has sought to remedy this problem. In one such remedy, each time a vehicle is to be towed, a device is inserted into that vehicle to operate its braking system, or to substitute for its braking system. The device is then connected to the braking system of said towing vehicle through hydraulic, high pressure air, or vacuum lines. Though more effective than having no contribution to overall braking from the towed vehicle, these remedies rarely approach the ideal, in which no additional load is placed on said towing vehicle's brakes. Further, in order to independently operate the towed vehicle, the installed braking device must be removed, as well as the hydraulic, air or vacuum lines. The inconvenience of repeatedly installing and removing braking devices and cumbersome lines has limited the acceptance of these types of prior art systems. Additionally, the required connection and disconnection may result in air or other contamination of the closed brake systems, rendering them inoperative.

U.S. Pat. No. 6,501,376 describes an apparatus for data exchange between a towing vehicle and towed vehicle comprising transmission/receiving modules in both vehicles to recognize that the vehicles and operatively connected. The transmission/receiving module of said towing vehicle transmits an identification signal and changes the electrical status connection line between the vehicles. If the transmission/receiving module located in the towed vehicle recognizes the change in the electrical status simultaneously with receiving the transmitted identification signal, the identification signal is stored within the towed vehicle. In subsequent communications between the vehicles the identification signal transmitted before the message allowing communication between the vehicles.

U.S. Pat. No. 6,608,554 relates to an apparatus to provide data communications associated with a heavy duty vehicle comprising at least one electronic subsystem associated with the heavy duty vehicle and a plurality of electrical conductors connected to the at least one electronic subsystem and associated with the heavy duty vehicle. A vehicle data communications protocol converter is connected to the plurality of electrical conductors for converting a first data communications protocol associated with data communications along the plurality of electrical conductors to a second data communications protocol such as an infrared or an RF data communications protocol. The apparatus also includes a transceiver connected to the data communications protocol converter for transmitting the second data communications protocol from the heavy duty vehicle and receiving the data communications protocol from a remote data communications terminal.

US 2005/0225169 shows a braking device comprising a brake actuator, a controller and a voltage regulator system to monitor the energy level of the towed vehicle battery.

US 2013/0158826 shows a braking assistance system for a vehicle towed comprising at least one sensor coupled to the towed vehicle to detect information about at the towed vehicle and said towing vehicle and an electronic control unit having a processor. The electronic control unit communicates with the sensor to receive status information regarding the vehicles. The processor is configured to determine an electrical connection between the vehicles determine a deceleration of the vehicles based on the information from the at least one sensor, identify a brake assist situation, and initiate a brake control operation to control braking of the towed vehicle during the brake assist situation.

US 2003/0168908 relates to a brake controller for controlling the brakes of a towed vehicle having a control module and a power module. The control module is mounted in the cab of a towing vehicle comprising an accelerometer to read acceleration forces in at least two axes and a microprocessor which polls the accelerometer and sends braking information to the power module. The control module includes a gain control to adjust the amount of brake force information, a manual braking lever and a display panel. The power module receives the braking information from the control module and secures power to actuate the brakes.

U.S. Pat. No. 6,609,766 shows a progressive and proportional braking system for use with a towed vehicle. Utilizing the towed vehicle's existing vacuum power assisted braking system.

U.S. Pat. No. 8,430,458 discloses an auxiliary braking system located in a towed vehicle for braking the towed vehicle including a remote control to selectively communicate with an auxiliary braking unit in a towing vehicle. The auxiliary braking system allows the operator of said towing vehicle to assess the functioning of the auxiliary braking unit. In addition, the operator is able to remotely effect real time adjustments to the performance parameters of the auxiliary braking system while driving.

US 2006/0071549 relates to an electronic controlled vacuum powered brake system for a towed vehicle such as a boat, horse, travel, fifth wheel and utility trailers. Comprising a vacuum power assisted master cylinder with two outlet ports of hydraulic power, a vacuum pump, a solenoid, an electronic power module, and a dash control module. The power brake unit is directly connected by lever arm to the solenoid of the towed vehicle.

U.S. Pat. No. 6,609,766 describes a braking system for a towing vehicle and a towed vehicle wherein said towing vehicle's brake system sends an electronic relay to the towed vehicle's brake system to apply the brakes of the towed vehicle at the proper rate of deceleration.

US 2004/0160117 shows an auxiliary braking apparatus configured for use with a towed vehicle. Configuring a solid-state inertia device to sense changes in inertia attributable to the braking of said towing vehicle. The auxiliary braking apparatus includes a reservoir constructed from a two-step injection molding process thereby lowering overall manufacturing costs of the braking apparatus as well as improving the ability of the reservoir to be directly mounted to the housing of the braking apparatus.

U.S. Pat. No. 6,126,246 relates to towed vehicle braking systems including a compressor to drive a fluid actuator with a piston attached to the towed vehicle's brake actuator, e.g., a brake pedal or hand grip. The braking system is actuated by either a towed vehicle velocity decrease sensor, a separation of the towed vehicle and said towing vehicle sensor and/or coded signals from a radio transmitter operated by the driver of said towing vehicle to control the braking system of the towed vehicle.

U.S. Pat. No. 6,631,636 shows a device for testing the hydraulic brake system of motor vehicles for the presence of small and extremely small leaks comprising a loading rod including a non-rotating extendable spindle and measuring head.

While some of the prior art may contain some similarities relating to the present invention, none of them teach, suggested or include all of the advantages and unique features of the invention disclosed hereafter.

SUMMARY OF THE INVENTION

The present invention relates to a brake and communication system to remotely control the braking of a towed vehicle and to transfer data between the towed vehicle and a towing vehicle such as an RV or recreational vehicle.

The vehicles are coupled together using a tow bar and a hard wire cable harness and/or link to provide two-way radio communications through a towing vehicle module mounted in the cab of said towing vehicle and a towed vehicle module mounted in the cab of the towed vehicle.

Said towing vehicle module comprises a microcontroller coupled to a towing vehicle control unit through an automotive vehicle self-diagnostic and reporting device port by a towing vehicle port connector and a towing vehicle control unit interface. A control panel comprising a display and control switches is coupled to said microcontroller to transmit and receive information and control signals between said microcontroller of said towing vehicle and the towed vehicle module. Transceivers may transmit and receive data and signals between said towing vehicle module and the towed vehicle module.

Said towing vehicle module microcontroller also includes a communications section to receive signals representative of a plurality of operating or status from the towed vehicle. Said microcontroller includes logic and circuitry to translate or convert these incoming information to be displayed in said towing vehicle.

The towed vehicle module comprises a microcontroller coupled to a towed vehicle control unit through an automotive vehicle self-diagnostic and reporting device port by a towed vehicle port connector and a towed vehicle control unit interface. A control panel comprising a display is coupled to said microcontroller to transmit and receive data and signals between said Microcontroller of the towed vehicle and said towing vehicle module. Transceivers may transmit and receive data and signals between said towing vehicle module and the towed vehicle module.

The towed vehicle module microcontroller receives operating signals corresponding to a plurality of operating or status conditions to be displayed from a towed vehicle self-diagnostic device. Said microcontroller includes logic and circuitry to translate or convert the operating or status signals to data signals for transmission to said towing vehicle module to be displayed.

The hard wire cable harness or link extending between said towing vehicle and towed vehicle couples the towed vehicle module through a cable connector and a cable connector receptacle to the brake lights and brake light switch of the towed vehicle through an existing towing vehicle hook-up or connector and the cable connector of said towing vehicle.

A braking event for the towed vehicle can be initiated from said towing vehicle in one of the three modes described hereinafter.

The first mode of initiating a braking sequence is to depress a manual brake switch on the control panel of said towing vehicle module to generate a brake signal fed to said microcontroller of said towing vehicle that, in turn, generates a braking signal transmitted to the transceiver of the towed vehicle module of the towed vehicle by the transceiver of said towing vehicle module of said towing vehicle. The brake signal received by the towed vehicle module is fed to said microcontroller of the towed vehicle module which, in turn, generates a brake control signal fed to the towed vehicle brake system to apply the brakes of the towed vehicle completing the brake activating sequence of the existing brakes system of the towed vehicle.

The second mode of initiating a towed vehicle braking sequence is to actuate the braking systems of said towing vehicle by applying a force to the brake pedal. In particular, the signal generated from the brake light switch or brake light signal is fed through the hard wire cable harness or link to said microcontroller of the towed vehicle module to generate a braking control signal fed to the towed vehicle brake system of the towed vehicle to apply the brakes of the towed vehicle to complete the brake activating sequence.

The brake signal from said towing vehicle may also be fed to the brake lights and tail lights of the towed vehicle through the hard wire cable harness or link and existing wiring of the towed vehicle. In addition, power may be fed from said towing vehicle to the towed vehicle through the hard wire cable harness of link to maintain voltage charge on the battery of the towed vehicle.

The third mode of initiating a towed vehicle braking sequence is to actuate the braking system of the towed vehicle when braking of said towing vehicle is sensed by a sensor such as a MEMS in said towing vehicle module to generate a braking sensor signal to be transmitted to the towed vehicle.

In particular, the braking sensor signal is fed to said microcontroller of said towing vehicle module to generate the brake signal fed to the towed vehicle module by either the transceiver of the towing module to the transceiver of the towed vehicle or through the hard wire cable harness or link. The towed vehicle module then generates the braking control signal fed to the brake system of the towed vehicle as previously described.

A braking event for the towed vehicle can also be initiated automatically by the towed vehicle module in a manner of initiating a towed vehicle braking sequence by detecting acceleration difference over time using said microcontroller and MEMS of the towed vehicle. Said microcontroller of the towed vehicle module then generates a braking control signal that is fed to the towed vehicle brake system to apply the brakes of the towed vehicle completing the brake activating sequence.

If a tow bar failure occurs and the towed vehicle becomes mechanically disconnected from said towing vehicle creating a break-away event said microcontroller of the towed vehicle module generates a braking control signal fed to the towed vehicle brake system to apply the brakes of the towed vehicle.

The towed vehicle includes a plurality of sensors to monitor or sense the operating or status conditions of the towed vehicle.

The corresponding sensors generate operating status signals fed from a towed vehicle control unit through a self-diagnostic device to said microcontroller for conversion to the signals for transmission to said towing vehicle module either through the tow bar and hard wire cable harness or two-way radio communication.

In operation, various operating conditions or parameters of the towed vehicle are fed to the self-diagnostic device for conversion to corresponding signals or information fed to said towing vehicle to be converted to corresponding operating signals representative of the preselected operating conditions of the towed vehicle for display. These operating conditions or parameters may include a braking event, a brake away or vehicle separation event, tire pressure, battery charge and transmission temperature. In addition, the braking, tail light and turn signal functions may be transmitted from said towing vehicle module to the towed vehicle module.

The invention accordingly comprises the features of construction, combination of elements, and arrangement of parts which will be exemplified in the construction hereinafter set forth, and the scope of the invention will be indicated in the claims.

BRIEF DESCRIPTION

For a fuller understanding of the nature and object of the invention, reference should be had to the following detailed description taken in condition with the accompanying drawings in which.

Figure 4:
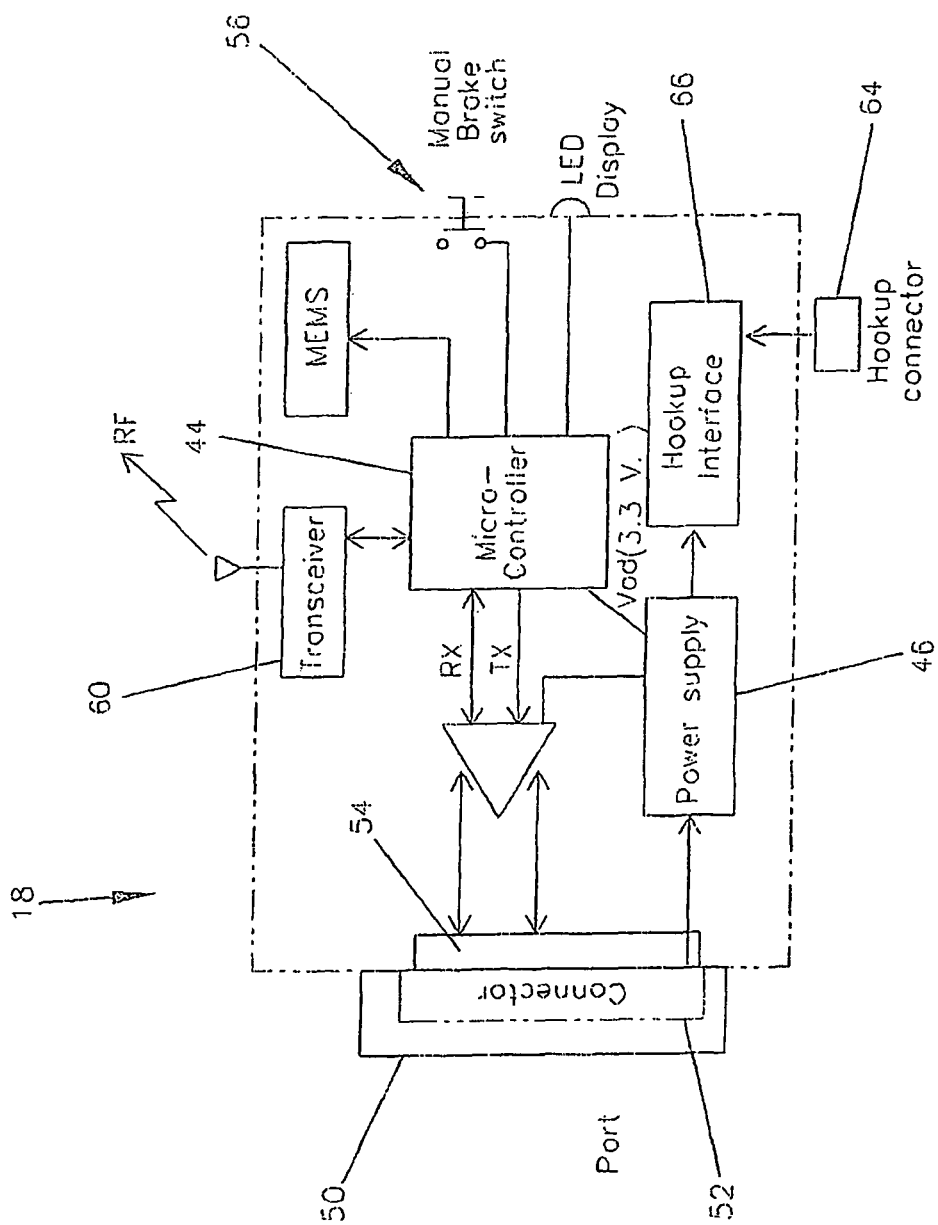

FIG. 4 depicting the components of the module of the brake and communication system of the present invention of the towed vehicle.

Figure 5:
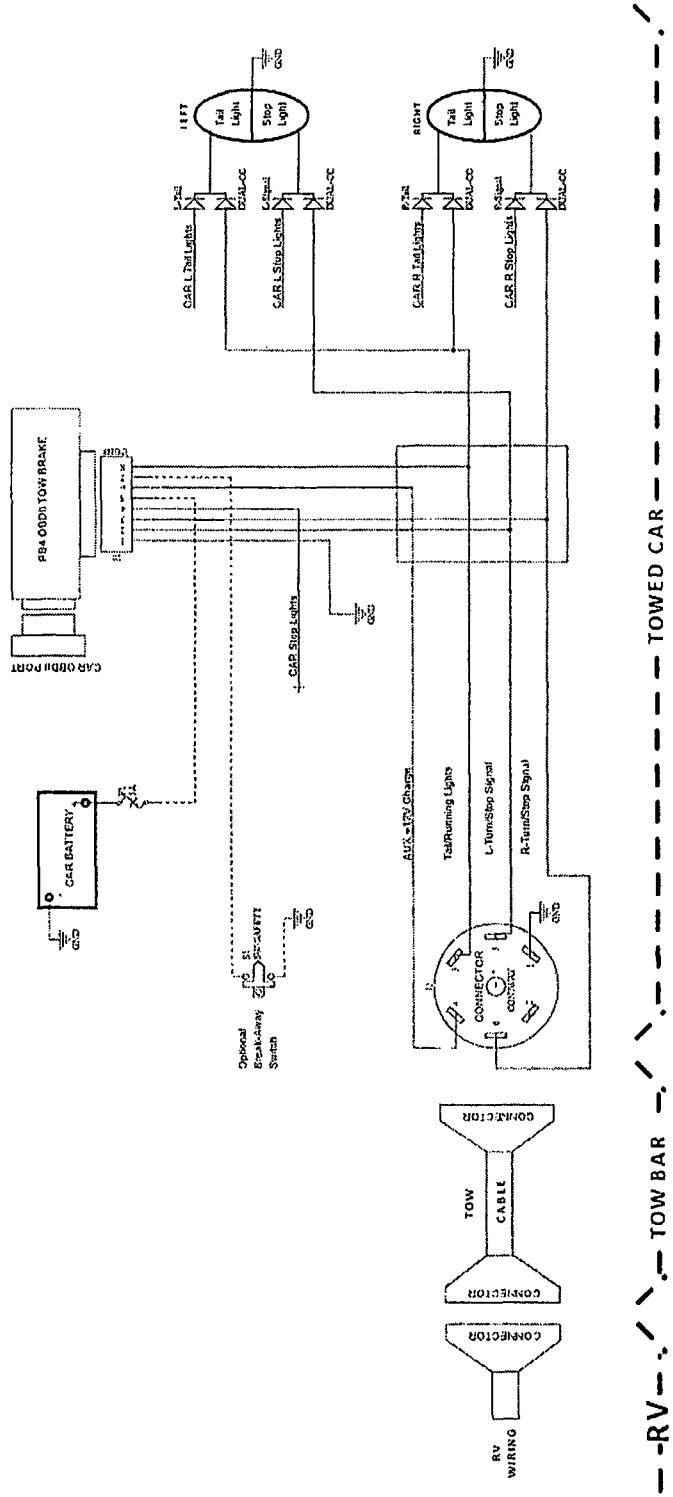

FIG. 5 is a wiring diagram of the towed vehicle connected to the cable harness of the brake and communication system of the present invention.

Figure 6:
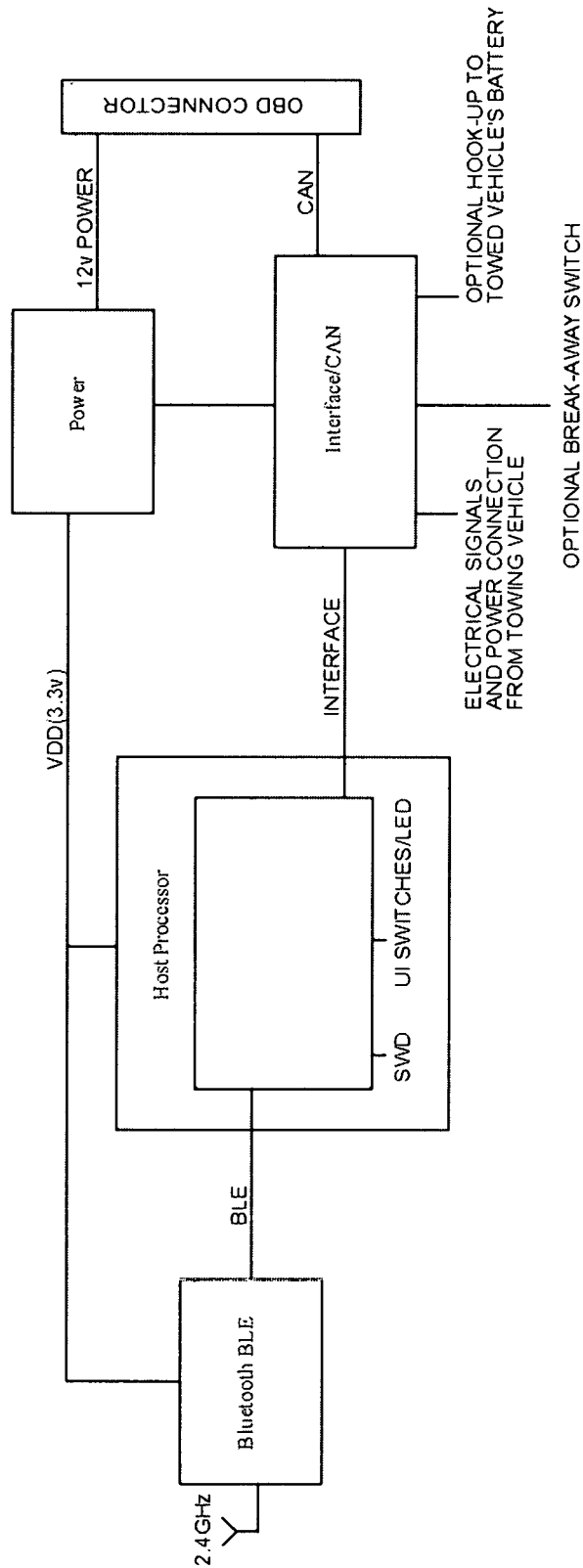

FIG. 6 is a block diagram of the circuitry of the towed vehicle module of the brake and communication system of the present invention.

Figure 7:
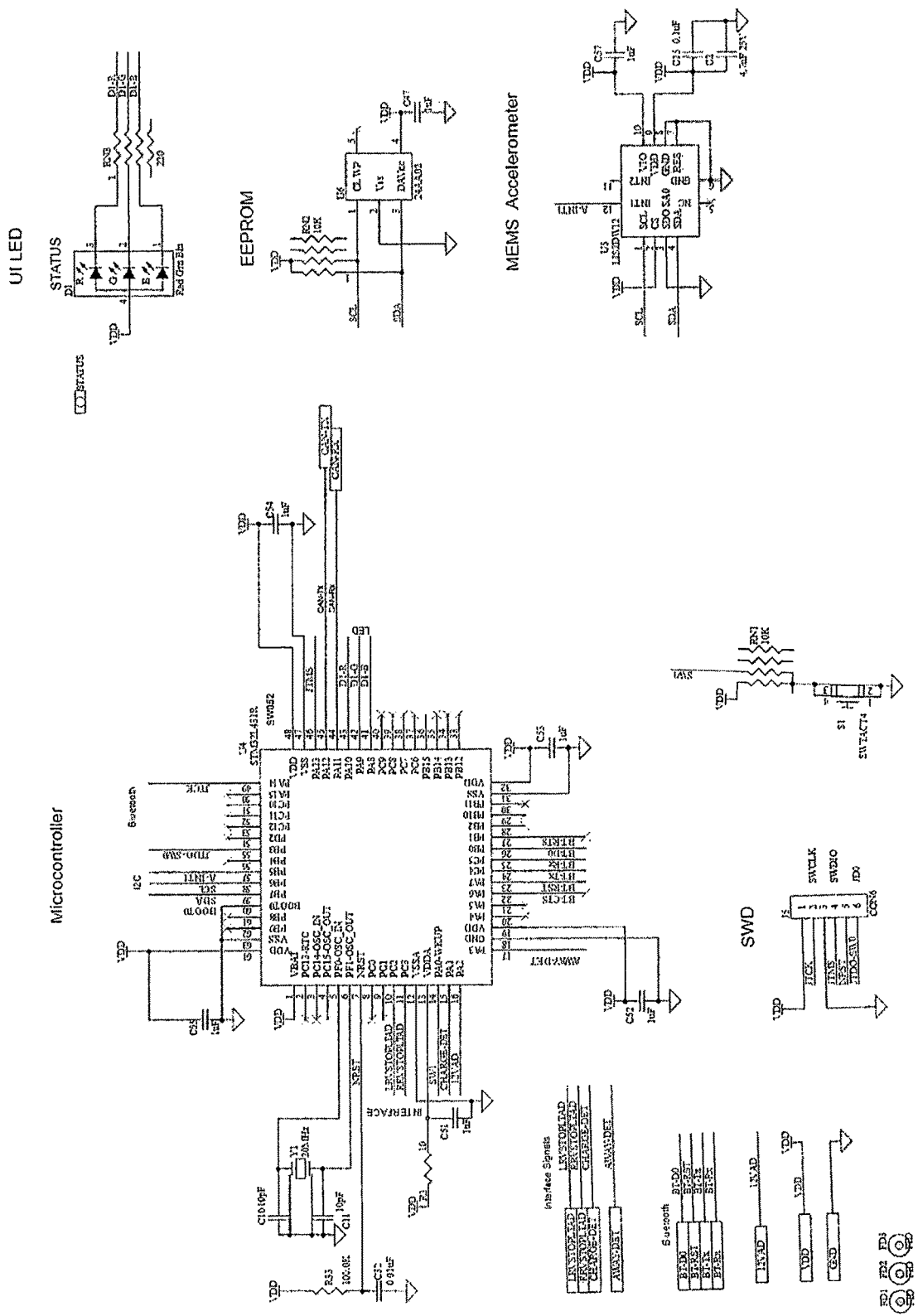

FIG. 7 is a schematic diagram of said microcontroller circuitry of the brake and communication system of the towed vehicle module of the present invention.

Figure 8:
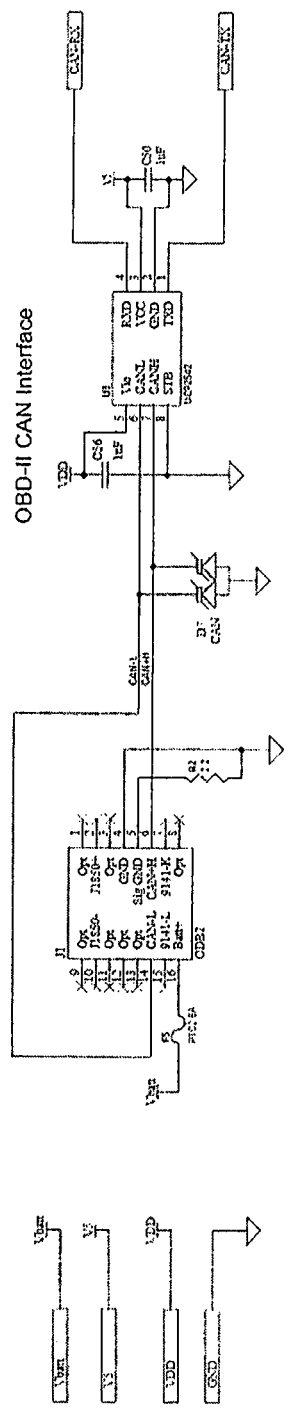

FIG. 8 is a schematic diagram of the interface circuitry of the brake and communication system of said towing vehicle and towed vehicle of the present invention.

Figure 9:
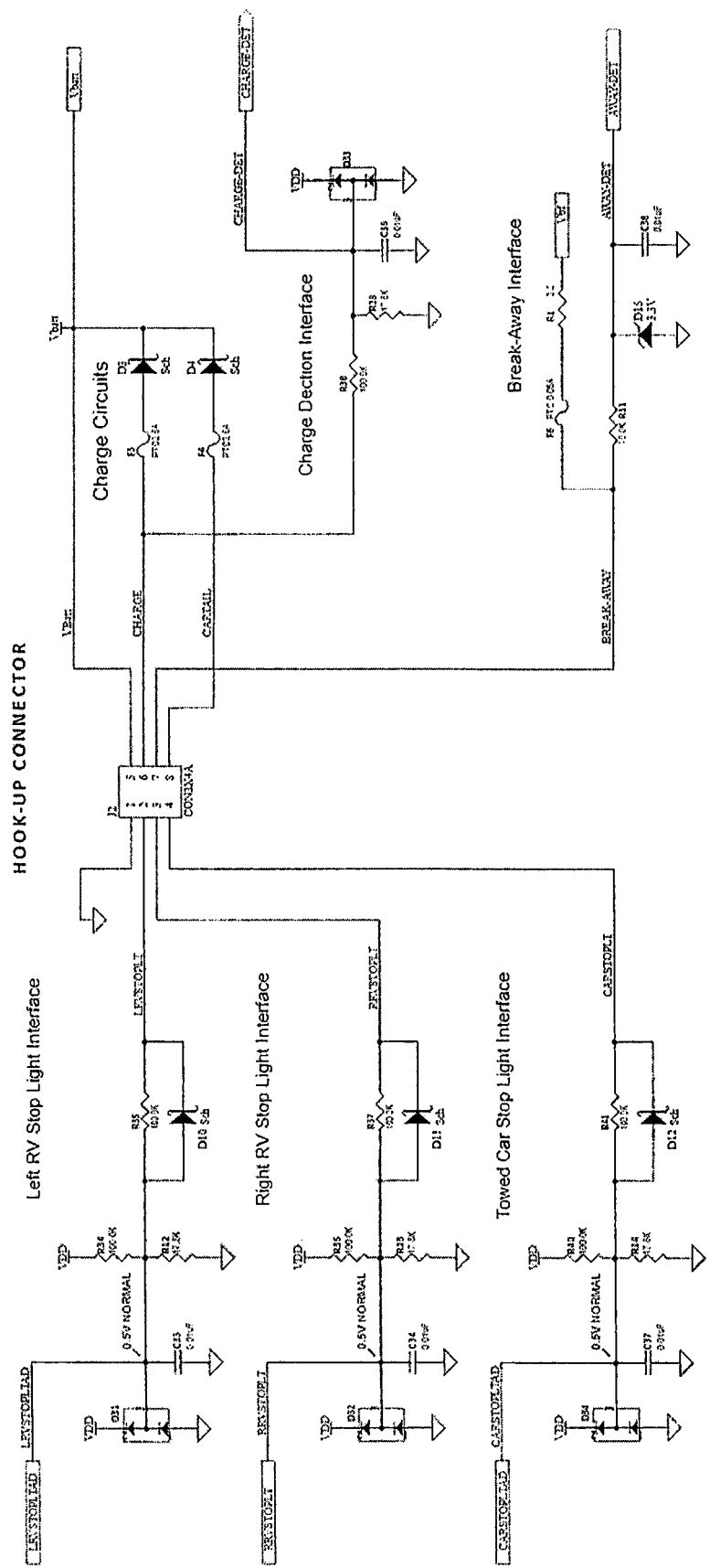

FIG. 9 is a schematic diagram of the hook-up connection circuitry of the brake and communication system of the present invention.

Figure 10:
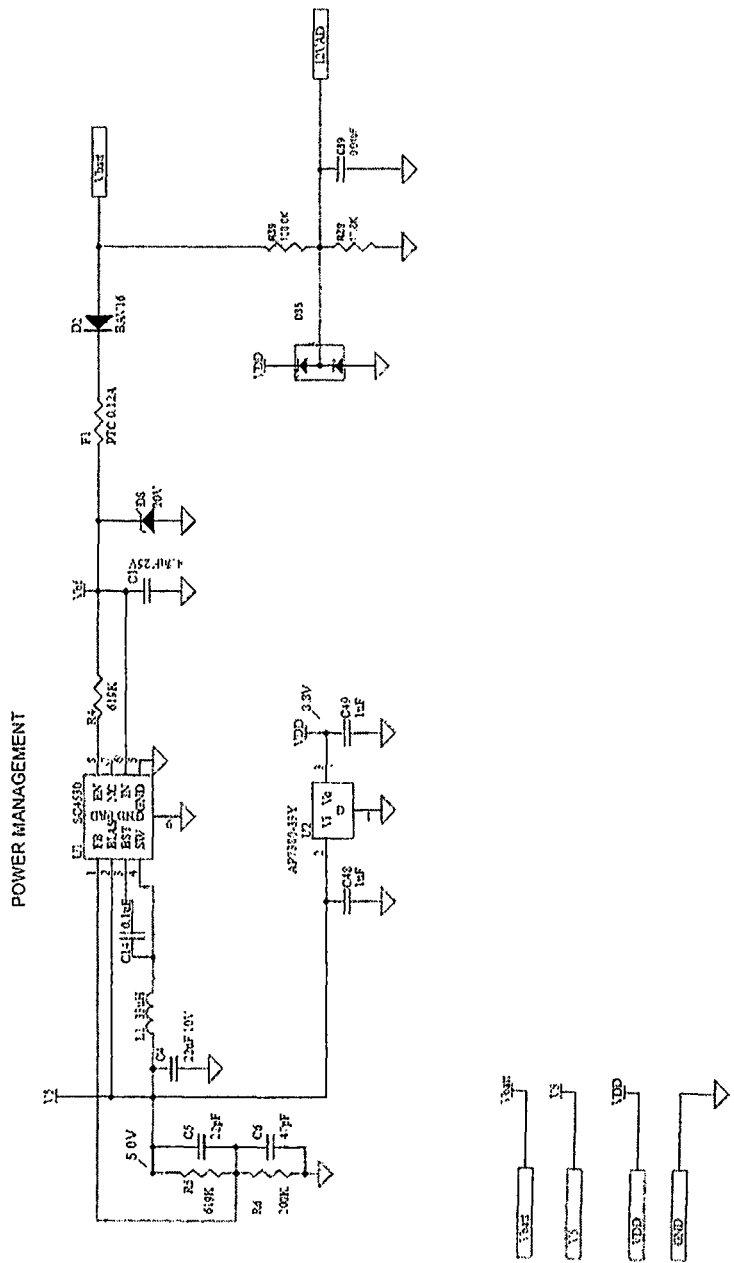

FIG. 10 is a schematic diagram of the power management circuitry of the brake and communication system of the present invention.

Figure 11:
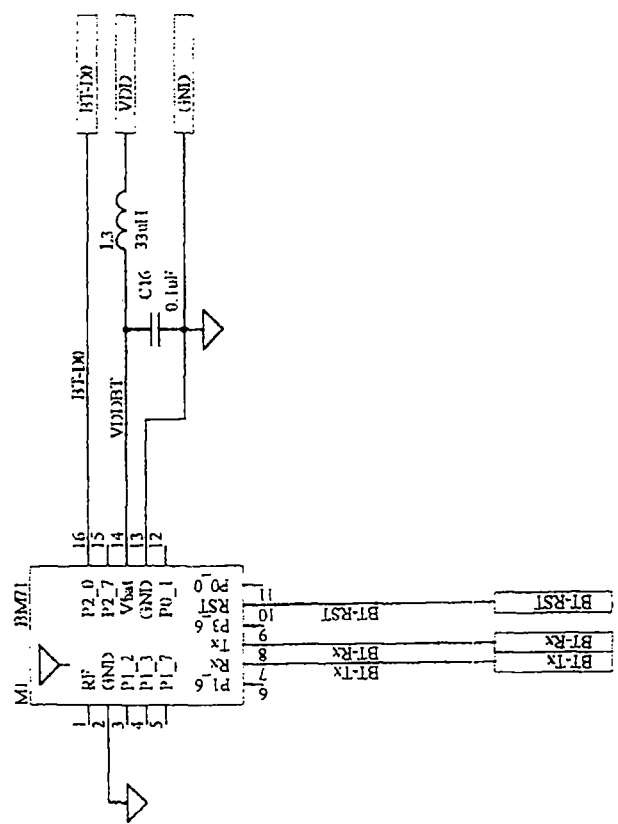

FIG. 11 is a schematic diagram of the Bluetooth circuitry of the brake and communication system of the present invention.

Figure 12:
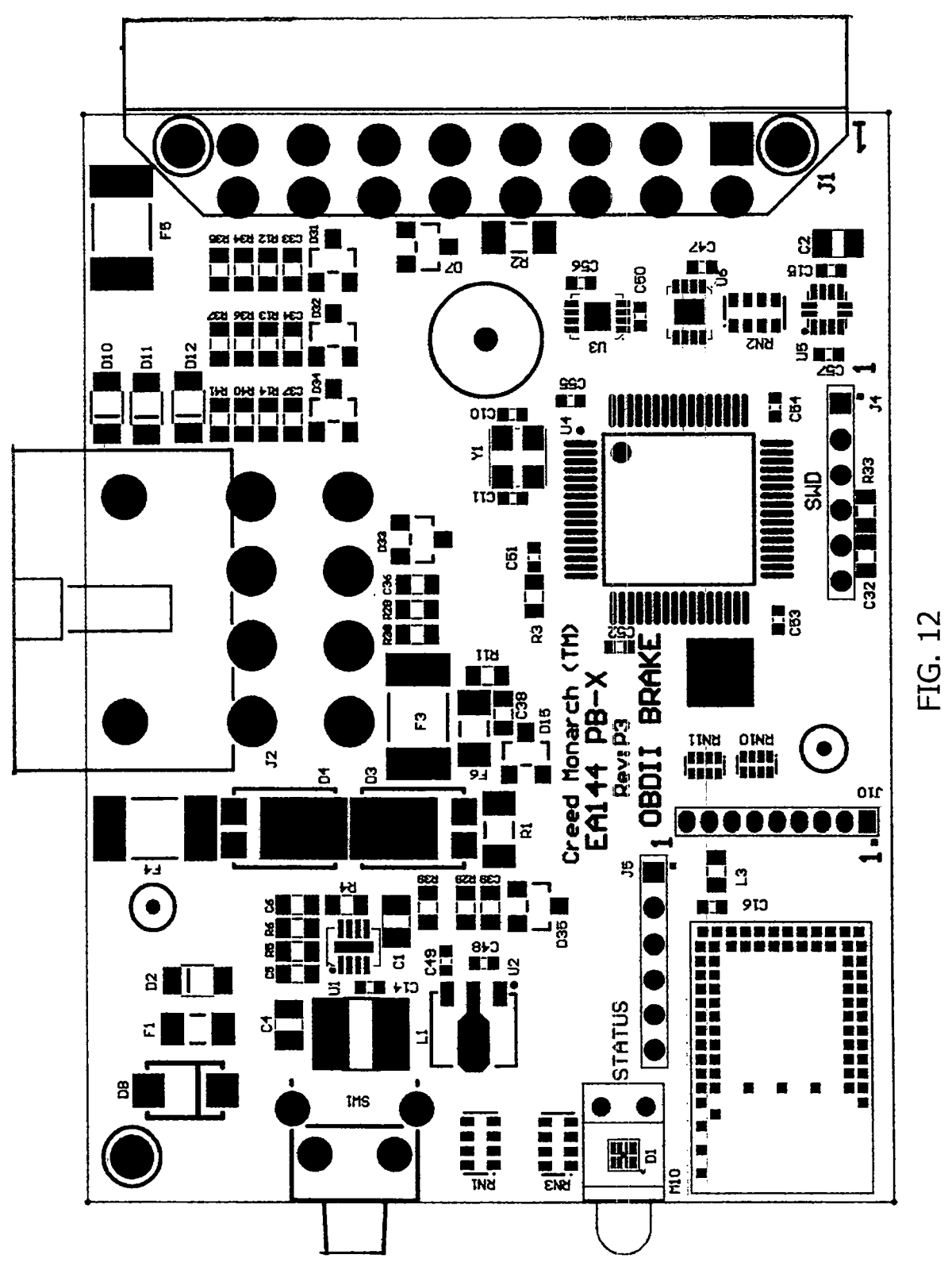

FIG. 12 is a top view of the printed circuit board of the brake and communication system of the present invention.

Figure 13:
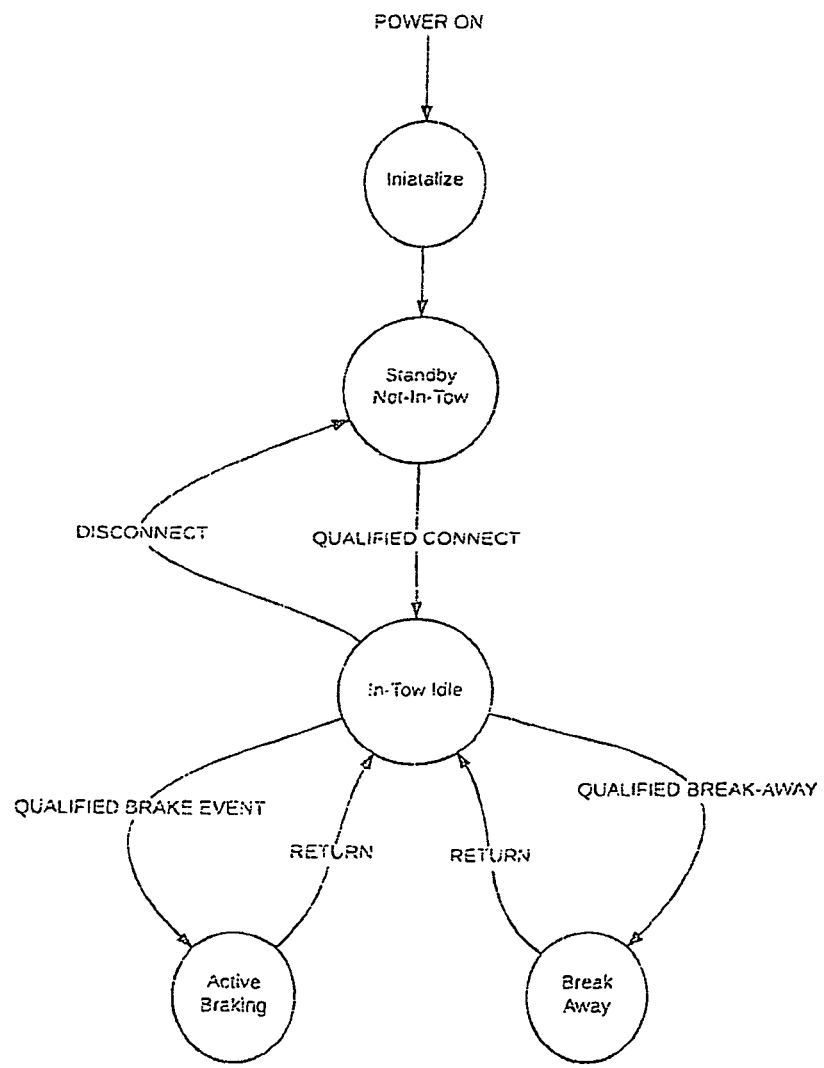

FIG. 13 is a state diagram of the brake and communication system of the present invention.

Figure 14:
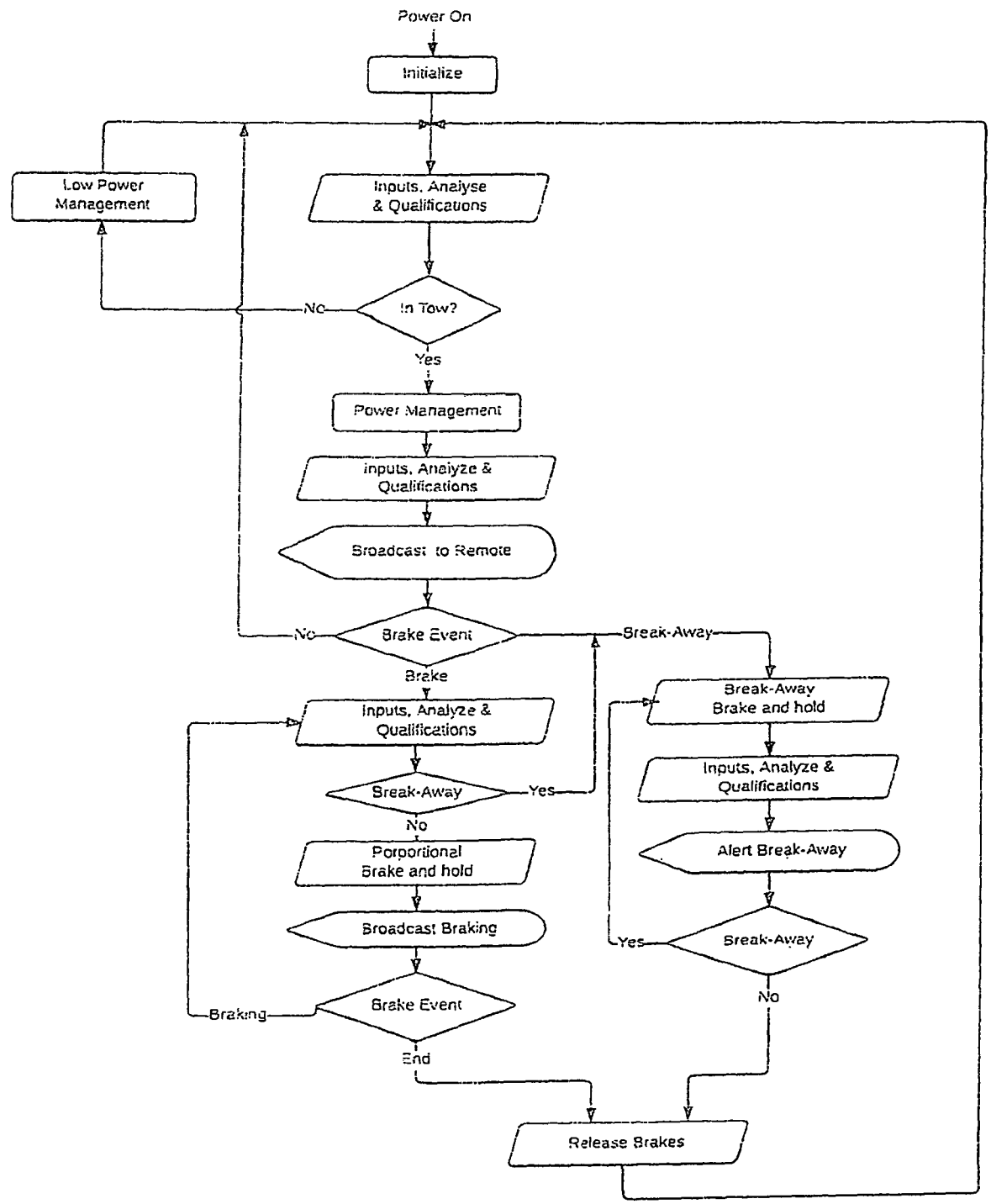

FIG. 14 is a flow chart of the brake and communication system of the present invention.

Similar reference characters refer to similar parts throughout the several views of the drawings.

DETAILED DESCRIPTION OF THE INVENTION

The present invention relates to a brake and communication system to remotely control the braking of a towed vehicle 10 by a towing vehicle 12 such as an RV or recreational vehicle and to transmit or transfer information or the data signals transmitted from the towed vehicle 10 to said towing vehicle 12 that represent the operational condition of predetermined or selected parameters sensed by a vehicle self-diagnostic device of the towed vehicle 10 when in tow.

Figure 1:
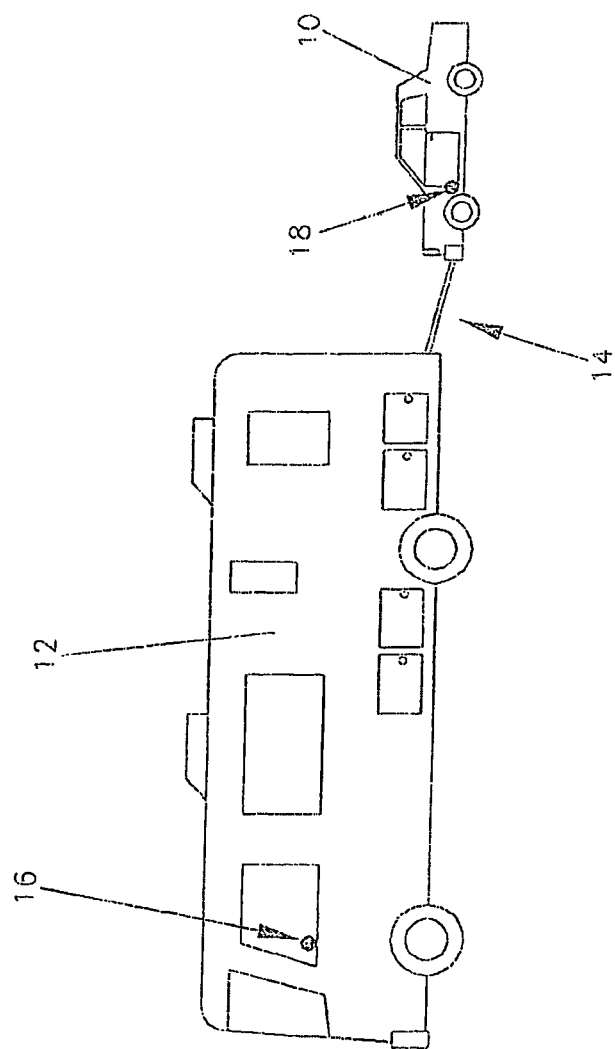
FIG. 1 is a side view of a towing vehicle and towed vehicle including the brake and communication system of the present invention.

The control signals and data are transferred over a tow bar and a hard wire cable harness generally indicated as 14 and/or through radio frequency transmission to transfer or feed the data signals from a towed vehicle module generally indicated as 18 mounted in the cab of the towed vehicle 10 to a towing vehicle module generally indicated as 16 mounted in the cab of said towing vehicle 12 (FIG. 1).

Figure 2:
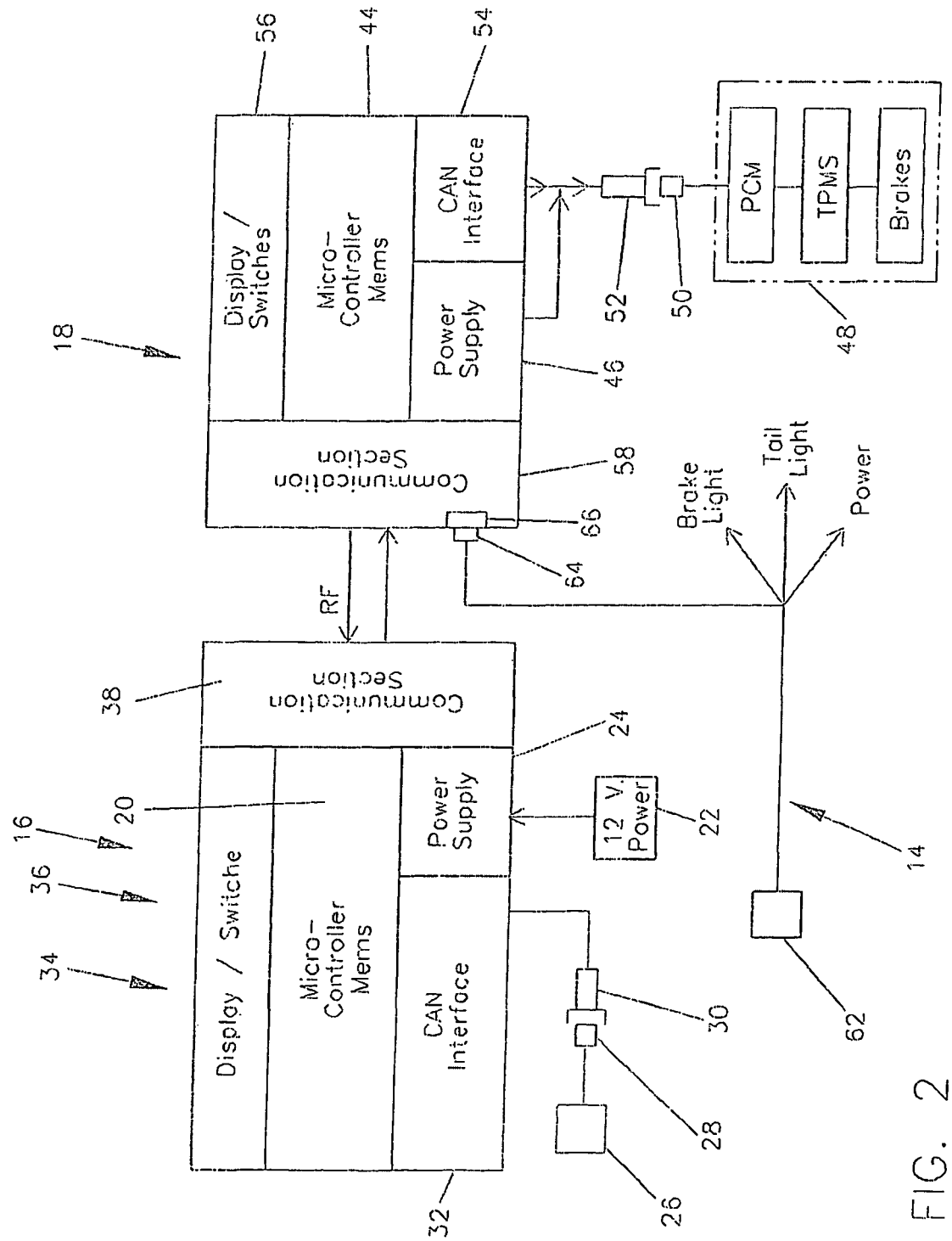
FIG. 2 is a diagram depicting the components of the modules of the brake and communication system of the present invention.

FIG. 2 depicts the major components of said towing vehicle module 16 and the towed vehicle module 18 in block form.

Figure 3:
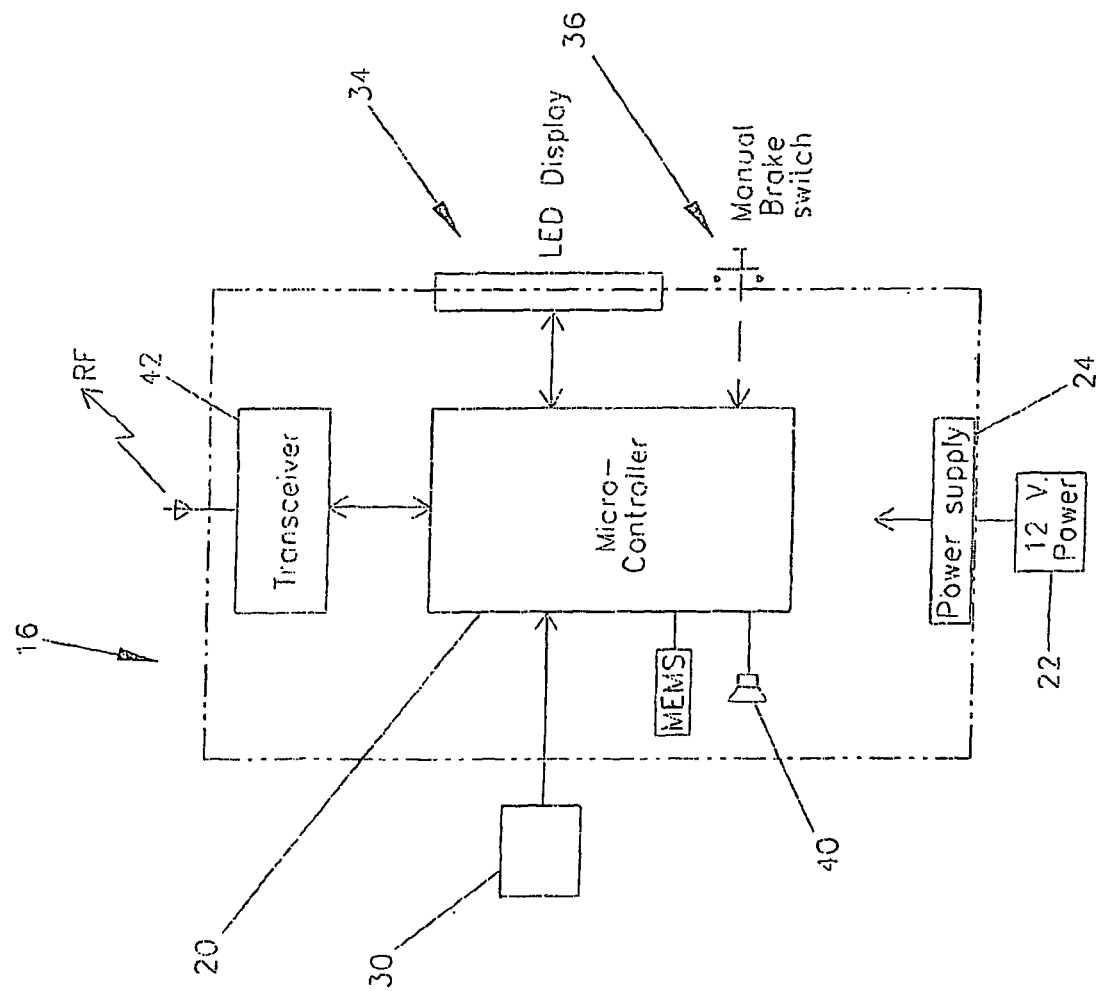
FIG. 3 is a diagram depicting the components of the module of the brake and communication system of the present invention of said towing vehicle.

As shown in FIGS. 2 and 3, said towing vehicle module 16 comprises a microcontroller 20 coupled to an external power source 22 by a towing vehicle power supply 24 and coupled to a towing vehicle control unit 26 such as a CAN network within said towing vehicle 12 through a self-diagnostic device port 28 such as an OBDII port by a towing vehicle port connector 30 and a towing vehicle control unit interface 32 such as a CAN network interface. A control panel comprising an LED display 34 and control switches 36 is coupled to said microcontroller 20 to transmit and receive information or data and control signals between said microcontroller 20 and the towed vehicle module 18 through a communication section 38 also coupled to said microcontroller 20. Further, said microcontroller 20 includes logic and circuitry to transfer or convert incoming signals to be displayed in said towing vehicle 12.

As shown in FIG. 3, said towing vehicle module 16 also includes an alarm 40 to generate an audio and/or visual indication when a predetermined condition such as towed vehicle break-away is detected. A MEMS or other sensor is provided to generate a deceleration signal upon braking of said towing vehicle 12. FIG. 3 also depicts a transceiver 42 to transmit and receive data and signals between said towing vehicle module 16 and the towed vehicle module 18.

As shown in FIGS. 2 and 4, the towed vehicle module 18 comprises a microcontroller 44 coupled to an external power source (not shown) by a towed vehicle power supply 46 and coupled to a towed vehicle control unit 48 such as a CAN network within the towed vehicle 10 through a self-diagnostic device port 50 such as an OBDII port by a towed vehicle port connector 52 and a towed vehicle control unit interface 54 such as a CAN interface. A control panel 56 comprising a LED display or status indicators is coupled to said microcontroller 44 to transmit and receive information or data and control signals from said microcontroller 44 through the communication section 58 to the communication section 38 of said towing vehicle module 16.

FIG. 4 also depicts a transceiver 60 to transmit data signals from the towed vehicle module 18 of the towed vehicle 10 to the transceiver 42 of said towing vehicle module 16 of said towing vehicle 12. In addition, transceiver 60 may communicate directly with cellular phones or tablet devices with communication capabilities such as Bluetooth using software applications.

As shown in FIG. 2, the hard wire cable harness 14 extending between said towing vehicle 12 and towed vehicle 10 couples the towed vehicle module 18 through a cable connector 64 and a cable connector receptacle 66 to the brake lights and brake light switch (not shown) of the towed vehicle 10 through an existing towing vehicle hook-up or connector (not shown) and the cable connector 62 of said towing vehicle 12.

The brake and communication system monitors and communicates or displays the status or operating conditions for a number of subsystems of the towed vehicle 10. In particular, a plurality of operating conditions such as the level of battery charge, tire pressure, transmission temperature, braking events and the like are individually sensed by sensors associated with each of the sub-systems being monitored. Information signals representing each of these predetermined or selected sub-systems are fed from the individual sensors (not shown) to the towed vehicle control unit 48. These information signals are then fed through the self-diagnostic port 50 to the microprocessor 44.

The microprocessor 44 includes logic and circuitry to translate or convert each individual information signal to a corresponding data signal for transmission to said towing vehicle module 16 through the tow bar and hard wire cable harness 14 or from the transceiver 60 to the transceiver 42.

Information or data signals are transmitted or fed from the towed vehicle module 18 through the tow bar and hard wire cable harness 14 or transmitted from transceiver 60 to transceiver 42 to said towing vehicle module 16 including said microcontroller 20 having logic and circuitry to translate or convert the individual data signals to corresponding information signals representative of the individual sub-system conditions from the towed vehicle control unit 48 through the self-diagnostic device 50 and a towed vehicle port connector 52. These information signals are then fed to the LED display 34.

The information or data signals may be fed and displayed continuously from the towed vehicle module 18 to said towing vehicle module 16 that, in turn, may be continuously displayed on the LED display 34. Alternately, the data signals may be transmitted displayed intermittently on demand. Finally, when any of the predetermined parameters or operating conditions reaches a predetermined threshold value or metric the corresponding data signal is transmitted from the towed vehicle module 18 to the towing vehicle module 16 to be converted and displayed on the LED display 34. In addition, an alert such as an audible alarm may be sounded by the alarm or speaker 40.

As shown in FIGS. 2, 7 and 9, the brake lights or brake light switch (not shown) of said towing vehicle 12 are also connected to the brake lights and tail lights of the towed vehicle 10. In addition, the battery (not shown) of the towed vehicle 10 may be coupled to a power source (not shown) in said towing vehicle 12 such as a battery (not shown).

Said towing vehicle 12 initiates a braking event for the towed vehicle 10 in one of the three distinct modes described hereinafter.

The first mode of initiating a towed vehicle braking sequence is to depress the manual brake switch 36 (FIGS. 2 and 3) on the control panel of said towing vehicle module 16 to generate a brake signal fed to said microcontroller 20 that, in turn, generates a braking signal transmitted to the transceiver 60 of the towed vehicle module 18 of the towed vehicle 10 by the transceiver 42 of the of said towing vehicle module 16 of said towing vehicle 12. The braking signal received by the transceiver 60 of the towed vehicle module 18 is then fed to said microcontroller 44 of the towed vehicle module 18 which, in turn, generates a braking signal is fed through the towed vehicle control unit interface 54, towed vehicle port connector 52, automotive vehicle self-diagnostic and reporting device 50 to the towed vehicle control unit 48 to actuate the towed vehicle brake system to apply the brakes of the towed vehicle 10 completing the brake activating sequence of the existing brake system of the towed vehicle 10.

A second mode of initiating a towed vehicle braking sequence is to actuate the braking system of said towing vehicle 12 by a applying force on the brake pedal (not shown). In particular, the signal generated from the brake light switch or brake light signal is fed to the cable connector 62 through the hard wire cable harness or link 14 and cable connector 64 to the communication section 58 of the towed vehicle module 18 through the cable connector receptacle 66. The signal is fed from the communication section 58 to said microcontroller 44 of the towed vehicle 10.

Said microcontroller 44 of the towed vehicle module 18 then generates a braking control signal that is fed through the towed vehicle control unit interface 54, towed vehicle port connector 52, automotive vehicle self-diagnostic and reporting device 50 to the towed vehicle control unit 48 to actuate the towed vehicle brake system to apply the brakes of the towed vehicle 10 completing the brake activating sequence.

As shown in FIG. 2, the braking signal from said towing vehicle 12 may also be fed to the brake lights and tail lights of the towed vehicle 10 through the hard-wired cable harness or link 14 and existing wiring of the towed vehicle 10. In addition, power may be fed from said towing vehicle 12 to the towed vehicle 12 through the hard wire cable harness or link 14 to maintain voltage charge on the battery of the towed vehicle 10.

The third mode of initiating a towed vehicle braking sequence is to actuate the braking system of the towed vehicle 10 when braking of said towing vehicle 12 is sensed by a sensor such as a MEMS in said towing vehicle module 16 to generate a braking sensor signal to be transmitted to the towed vehicle 10.

In particular, the braking sensor signal is fed to the logic and circuitry of said microcontroller 20 of said towing vehicle module 16 that generates the braking signal to be fed to the towed vehicle module 18 by either the transceiver 42 of the towing module 16 to the transceiver 60 of the towed vehicle 10 or through the hard-wire cable harness or link 14.

The towed vehicle module 18 then generates the braking control signal fed to the brake system of the towed vehicle 10 as previously described.

In addition, a braking event can also be initiated automatically by the towed vehicle module 18 in a manner of initiating a towed vehicle braking sequence by detecting acceleration difference over time using said microcontroller and MEMS 44. Said microcontroller 44 of the towed vehicle module 18 then generates a braking control signal that is fed through the towed vehicle control unit interface 54, towed vehicle port connector 52, automotive vehicle self-diagnostic and reporting device 50 to the towed vehicle control unit 48 to actuate the towed vehicle brake system to apply the brakes of the towed vehicle 10 completing the brake activating sequence.

During active braking events said microcontroller 44 generates proportional brake signals proportional to brake towed vehicle 10 to acceleration generated by towing RV or other towing vehicle 12 based on the multiple signals including the MEMS acceleration sensor in towed vehicle module 18. The towed vehicle brakes are signaled to release by the same method as brake initiation except communicating to terminate braking, upon exiting brake events.

A break-away event occurs when said towing vehicle 12 and towed vehicle 10 become mechanically disconnected. A break-away switch located by tow bar or hard wire cable harness or link 14 connected to a hook-up connector detects the break-away event. Alternately a signal is generated by said microcontroller 44 by detecting a loss of the charging connection in the tow bar or hard wire cable harness or link 14. Said microcontroller 44 sequences through a break-away sequence. Said microcontroller 44 of the towed vehicle module 18 then generates a braking control signal fed through the towed vehicle control unit interface 54, towed vehicle port connector 52, automotive vehicle self-diagnostic and reporting device 50 to the towed vehicle control unit 48 to actuate the towed vehicle brake system to apply the brakes of the towed vehicle 10. During break-away events said microcontroller 44 of the towed vehicle generate signals to brake at settable levels of braking force stored in said microcontroller 44 non-volatile memory in the towed vehicle module 18 along with signals to sound towed vehicle horn alarm 40 and illuminate brake lights. The towed vehicle 10 brakes force may be sequenced with high initial braking force to stop the towed vehicle 10, then folds back braking force to hold the towed vehicle 10 stationary until the break-away event is terminated and brakes are signaled to release by the same method as brake initiation except communicating to terminate braking upon exiting break-away event. During break-away events, notifications are generated and communicated by towed vehicle module 18 to alert and broadcast status to the control and display console of said towing vehicle 12.

During towing vehicle 12 or towed vehicle 10 braking events, the towed vehicle module 18 may generate towed vehicle brake light command signals by said microcontroller 44 of the towed vehicle module 18 which, in turn, generates a braking light signal fed through the towed vehicle control unit interface 54, towed vehicle port connector 52, automotive vehicle self-diagnostic and reporting device 50 to the towed vehicle control unit 48 to illuminate the towed vehicle brake lights of the towed vehicle 10 to indicate a brake sequence.

General operational towed vehicle lights for example turn signals, running and back-up lights may be controlled by towing vehicle module 16 to generate a light signal fed to said microcontroller 20 that, in turn, generates a lighting signal transmitted to the transceiver 60 of the towed vehicle module 18 of the towed vehicle 10 by the transceiver 42 of the of said towing vehicle module 16 of said towing vehicle 12. The light signal received by the transceiver 60 of the towed vehicle module 18 is then fed to said microcontroller 44 of the towed vehicle module 18 which, in turn, generates a light signal fed through the towed vehicle control unit interface 54, towed vehicle port connector 52, automotive vehicle self-diagnostic and reporting device 50 to the towed vehicle control unit 48 to illuminate the towed vehicle lights of the towed vehicle.

The electronics, components, circuitry and logic of the present invention are similar to those described in nonprovisional application Ser. No. 15/932,947 filed May 25, 2018, provisional application Ser. No. 63/100,665 filed Mar. 23, 2020, and provisional application Ser. No. 63/102,252 filed Jun. 4, 2020 and incorporated herein by reference.

FIG. 5 is a wiring diagram of the towed vehicle 10 is connected to said towing vehicle 12 by the hardwired cable harness or link 14.

FIG. 6 is a block diagram of the various circuit components of the communication system of the towed vehicle module 18.

FIG. 7 is a schematic diagram of said microcontroller circuitry and associated peripheral circuitry of the towed vehicle module 18.

FIG. 8 is a schematic diagram of the vehicle control unit interface circuitry of the interface connected to said microcontroller, power management and hook-up connector of the towed vehicle module 18.

FIG. 9 is a schematic diagram of the hook-up connector circuitry connected to the power management to provide signals through interface circuitry for microcontroller to process the various states of operation of the towed vehicle module 18.

FIG. 10 is a schematic diagram of the power management circuitry connected to said microcontroller, interface, hook-up connector and Bluetooth to provide power to the individual circuit components.

FIG. 11 is a schematic diagram of the Bluetooth circuitry connected to said microcontroller and power management of the towed vehicle module 18.

FIG. 12 is a top view of the printed circuit board depicting the actuated circuit components implementing the electronics of the towed vehicle module 18.

FIG. 13 is a brake state diagram showing the operational status of the communication system.

FIG. 14 is a brake flow chart depicting the logic sequence of the communication system.

Once power is provided to the towed vehicle 10, said microcontroller 44 configures all inputs, outputs, initial values and conditions.

When the towed vehicle module 18 is initialized, the brake and communication system is placed in standby not-in-tow state. This reduces electrical power to the lowest amount to prevent discharging the towed vehicle 10 battery. Only in-tow detection circuitry is powered and processed by microcontroller 44 to qualify connection to a towing RV or other towing vehicle 12.

Diagnostics are processed by microcontroller 44 of the towed vehicle 10 to determine proper and safe operation of the brake and communication system. Diagnostic functions include proper and safe operation of the tow brake system. Diagnostic functions include computer-operating-properly timer or watch-dog timer time-out allowable combinations of inputs and outputs including towed vehicle 10 stop light signal on when brake and communication system is not braking or actuated, sensor measurements in acceptable ranges, sequence time outs, predetermined rules, combinational and state variables or any other items effecting the normal and safe operation of brake and communication system.

Qualified-in-tow connection of towed vehicle 10 coupled to towing RV or other towing vehicle 12 is determined by microcontroller 44 processing multiple signals of hook-up connector signals, internal interface signals and microcontroller memory over predetermined periods of time.

In-tow idle state entered by qualified in-tow connection, the electronically controlled tow brake system powers up and processes interface circuitry and MEMS acceleration sensor with microcontroller 44 to determine and qualify a supplemental braking event or a disconnection. Status sensors may be used solely or in conjunction with other signals to qualify a braking event.

Braking events are determined by the brake and communication system when said microcontroller 44 selectively processes any combination of multiple signals including control and display console command, hook-up connector signals, interface signals, MEMS accelerometer, microcontroller 44 memory variables along with timing requirements over predetermined periods of time to qualify braking event. Hook-up connector signals used to determine braking events may include simultaneous left and right turn/brake light signals, loss of charge line signal or a brake control signal from a remote brake controller (not shown). Interface signals used to determine braking event may include break-away signal. MEMS acceleration sensor may be used solely or in conjunction with other signals to qualify a braking event.

Braking event state entered by qualified brake event detection by microcontroller 44 repeatedly analyzes multiple signals including control and display console command, hook-up connector signals, interface signals, MEMS accelerometer, microcontroller, memory variables and timing to perform proportional braking or exit active braking state to diagnostic fault, break-away or end or braking event. During active braking events microcontroller 44 generates proportional brake signals proportional to brake towed vehicle 10 to acceleration generated by towing RV or other towing vehicle 12 based on the multiple signals including the MEMS acceleration sensor on the PCB.

Break-away event state entered by break-away detection using a break away switch located by tow bar connector harness 14 connected to hook-up connector or a generated signal by microcontroller 44 detecting a loss of the charging connection in the tow bar connector harness 14. Microcontroller 44 sequences through multiple break-away phases including break-away event notifications to alert and broadcast to the control and display console.

The towed vehicle brakes are released upon exiting brake events.

Fault may be processed by the detection signals said microcontroller 44 to perform a management sequence, reinitialization of microcontroller 44 and user indication on brake unit as well as with control and display console.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

In describing the invention, certain terms are used for brevity, clarity, and understanding. No unnecessary limitations should be inferred beyond the requirement of the prior art because such terms are used for descriptive purposes and are intended to be broadly construed. The different structural and functional elements, apparatuses, devices, compositions, and methods described herein may be used alone or in combination with other structural and functional elements, apparatuses, devices, compositions, systems and methods. It is to be expected that various equivalents, alternatives and modifications are possible.

What is claimed is:

1. A brake and communication system to remotely control the braking of a towed vehicle from a towing vehicle comprising a towing vehicle module including a microcontroller having logic and circuitry to generate a braking signal in response to braking of said towing vehicle fed through an automotive vehicle self-diagnostic device port and vehicle control unit interface to the brake system of the towed vehicle and a towed vehicle module including a microcontroller having logic and circuitry to generate a brake control signal fed to the brake system of the towed vehicle through a vehicle control unit interface and automotive self-diagnostic port to electronically actuate the towed vehicle brakes and to transfer data between the towing vehicle and the towed vehicle including information of selected vehicle control network operating parameters generated in the towed vehicle through said microcontroller to a remote monitor or display in the towing vehicle to display and to alert the driver of the towing vehicle of the status of predetermined operating parameters of the towed vehicle when in tow wherein said towing vehicle module microcontroller is coupled to an external power source by a towing vehicle power supply and coupled to a towing vehicle control unit comprising a CAN network interface within the towing vehicle through a self-diagnostic device port and a towing vehicle control unit interface and said towed vehicle module microcontroller is coupled to an external power source by a towed vehicle power supply and coupled to a towed vehicle control unit comprising a CAN network interface within the towed vehicle through a self-diagnostic device port and a towed vehicle control unit interface and wherein a brake and communication system monitors and communicates the status of at least one of the predetermined operating parameters and wherein at least one predetermined operating parameters comprises the level of battery charge, tire pressure, transmission temperature or braking events sensed by sensors associated with each of the predetermined operating parameters being monitored.

2. The brake and communication system to remotely control the breaking of a towed vehicle from a towing vehicle of claim 1 wherein the control signals and data are transferred over a tow bar and a hard wire cable harness to transfer the data signals from said towed vehicle module mounted in the cab of the towed vehicle to said towing vehicle module mounted in the cab of said towing vehicle.

3. The brake and communication system to remotely control the breaking of a towed vehicle from a towing vehicle of claim 1 wherein a radio frequency transmission transfers the data signals from said towed vehicle module mounted in the cab of the towed vehicle to said towing vehicle module mounted in the cab of said towing vehicle.

4. The brake and communication system to remotely control the braking of a towed vehicle from a towing vehicle of claim 1 wherein said CAN network interface of said towing vehicle control unit comprises an OBD II port and said CAN network interface of said towed vehicle control unit comprises an OBD II port.

5. The brake and communication system to remotely control the braking of a towed vehicle from a towing vehicle of claim 4 further including a towing vehicle control panel comprising a display and control switches coupled to said microcontroller of the towing vehicle to transmit and receive data and control signals between said microcontroller of the towing vehicle and the towed vehicle module through a communication section coupled to said microcontroller of said towing vehicle and a towed vehicle control panel comprising a display coupled to said microcontroller of the towed vehicle to transmit and receive data and control signals from said microcontroller of the towed vehicle through a communication section to said communication section of towing vehicle.

6. The brake and communication system to remotely control the braking of a towed vehicle from a towing vehicle of claim 5 wherein said towing vehicle module includes an alarm to generate an audio and/or visual indication when at least one predetermined operating condition of the towed vehicle is detected.

7. The brake and communication system to remotely control the breaking of a towed vehicle from a towing vehicle of claim 6 further including a towed vehicle transceiver to transmit data signals from said towed vehicle module of the towed vehicle to a towing vehicle transceiver of said towing vehicle module.

8. The brake and communication system to remotely control the braking of a towed vehicle from a towing vehicle of claim 1 wherein at least one predetermined operating condition comprises the level of battery charge, tire pressure, transmission temperature and or braking events sensed by sensors associated with each of said sub-systems being monitored.

9. The brake and communication system to remotely control the braking of a towed vehicle from a towing vehicle of claim 1 wherein information data representing each of said selected sub-systems are fed from individual sensors to said towed vehicle control unit through said self-diagnostic port to said microprocessor of said towed vehicle.

10. The brake and communication system to remotely control the breaking of a towed vehicle from a towing vehicle of claim 9 wherein said microprocessor of said towed vehicle includes logic and circuitry to translate or convert each said individual information data to a corresponding data signal for transmission to said towing vehicle module and said microcontroller of said towing vehicle includes logic and circuitry to convert said data signals to information signals corresponding to said predetermined operating conditions fed to said display.

11. The brake and communication system to remotely control the breaking of a towed vehicle from a towing vehicle of claim 10 wherein said data signals are fed continuously from said towed vehicle module to said towing vehicle module and continuously displayed on said display.

12. The brake and communication system to remotely control the braking of a towed vehicle from a towing vehicle of claim 10 wherein said data signals are transmitted and displayed intermittently on demand from said towing vehicle module.

13. The brake and communication system to remotely control the braking of a towed vehicle from a towing vehicle of claim 1 wherein any of the operating parameters reaches a predetermined threshold value or metric a corresponding data signal is transmitted from said towed vehicle module to said towing vehicle module to be converted and display on said display and an alert is generated.

14. The brake and communication system to remotely control the braking of a towed vehicle from a towing vehicle of claim 1 wherein when a towed vehicle braking sequence is initiated said towing vehicle module generates a brake signal fed to said microcontroller of said towing vehicle to generate a braking signal transmitted to said transceiver of the towed vehicle module of the towed vehicle by said transceiver of said towing vehicle module of said towing vehicle, said braking signal received by said transceiver of said towed vehicle module is fed to said microcontroller of said towed vehicle module to generate a braking signal fed through said vehicle control unit interface, towed vehicle port connector, automotive vehicle self-diagnostic and reporting device to said towed vehicle control unit to actuate the towed vehicle brake system to apply the brakes of the towed vehicle completing the braking activating sequence of the existing brake system of the towed vehicle.

15. The brake and communication system to remotely control the breaking of a towed vehicle from a towing vehicle of claim 1 wherein during a braking event said towed vehicle module generates a towed vehicle brake light command signal by said microcontroller of said towed vehicle module to generate a braking light signal fed through said towed vehicle control unit interface, towed vehicle port connector, automotive vehicle self-diagnostic and reporting device to said towed vehicle control unit to illuminate the towed vehicle brake lights of the towed vehicle 10 to indicate a brake sequence.

16. A brake and communication system to remotely control the braking of a towed vehicle from a towing vehicle comprising a towing vehicle module including a microcontroller having logic and circuitry to generate a braking signal in response to braking of said towing vehicle fed through an automotive vehicle self-diagnostic device port and vehicle control unit interface to the brake system of the towed vehicle and a towed vehicle module including a microcontroller having logic and circuitry to generate a brake control signal fed to the brake system of the towed vehicle through a vehicle control unit interface and automotive self-diagnostic port to electronically actuate the towed vehicle brakes and to transfer data between the towing vehicle and the towed vehicle including information of selected vehicle control network operating parameters generated in the towed vehicle through said microcontroller to a remote monitor or display in the towing vehicle to display and to alert the driver of the towing vehicle of the status of predetermined operating parameters of the towed vehicle when in tow wherein said towing vehicle module microcontroller is coupled to an external power source by a towing vehicle power supply and coupled to a towing vehicle control unit comprising a CAN network interface within the towing vehicle through a self-diagnostic device port and a towing vehicle control unit interface and said towed vehicle module microcontroller is coupled to an external power source by a towed vehicle power supply and coupled to a towed vehicle control unit comprising a CAN network interface within the towed vehicle through a self-diagnostic device port and a towed vehicle control unit interface and wherein a brake and communication system monitors and communicates the status of at least one of the predetermined operating parameters and wherein when any of the predetermined operating parameters reaches a predetermined threshold value or metric a corresponding data signal is transmitted from said towed vehicle module to said towing vehicle module to be converted and displayed on said display and an alert is generated.

17. A brake communication system to remotely control the braking of a towed vehicle from a towing vehicle comprising a towing vehicle module including a microcontroller having logic and circuitry to generate a braking signal in response to braking of said towing vehicle fed through an automotive vehicle self-diagnostic device port and vehicle control unit interface to the brake system of the towed vehicle and the towed vehicle including a microcontroller having logic and circuitry to generate a brake control signal fed to the brake system of the towed vehicle through a vehicle control unit interface and automotive self-diagnostic port to electronically actuate the towed vehicle brakes and to transfer data between the towing vehicle and the towed vehicle including information of selected vehicle control network operating parameters generated in the towed vehicle through said microcontroller to a remote monitor or display in the towing vehicle to display and to alert the driver of the towing vehicle of the status of predetermined operating parameters of the towed vehicle when in tow wherein said towing vehicle module microcontroller is coupled to an external power source by a towing vehicle power supply and coupled to a towing vehicle control unit comprising a CAN network interface within the towing vehicle through a self-diagnostic device port and a towing vehicle control unit interface and said towed vehicle module microcontroller is coupled to an external power source by a towed vehicle power supply and coupled to a towed vehicle control unit comprising a CAN network interface within the towed vehicle through a self-diagnostic device port and a towed vehicle control unit interface further including a towing vehicle control panel comprising a display and control switches coupled to said microcontroller of the towing vehicle to transmit and receive data and control signals between said microcontroller of said towing vehicle and said towed vehicle module through a communication section coupled to said microcontroller of the towing vehicle and a towed vehicle control panel comprising a display coupled to said microcontroller of the towed vehicle to transmit and receive data and control signals from said microcontroller of the towed vehicle through a communication section to said communication section of the towed vehicle wherein said towing vehicle module includes an audio and/or visual indicator when at least one predetermined operating parameter of the towed vehicle is detected and further including a towed vehicle transceiver to transmit data signals from said towed vehicle module of the towed vehicle to a towing vehicle transceiver of said towing vehicle module and a brake and communication system to monitor and communicate the status of at least one predetermined operating parameters and wherein when any of the predetermined operating parameters reaches a predetermined threshold value or metric a corresponding data signal is transmitted from said towed vehicle module to said towing vehicle module to be converted and displayed on said display and an alert is generated.

18. A brake and communication system to remotely control the braking of a towed vehicle from a towing vehicle comprising a towing vehicle module including a microcontroller having logic and circuitry to generate a braking signal in response to braking of said towing vehicle fed through an automotive vehicle self-diagnostic device port and vehicle control unit interface to the brake system of the towed vehicle and a towed vehicle module including a microcontroller having logic and circuitry to generate a brake control signal fed to the brake system of the towed vehicle through a vehicle control unit interface and automotive self-diagnostic port to electronically the towing vehicle and the towed vehicle including information of selected vehicle control network operating parameters generated in the towed vehicle through said microcontroller to a remote monitor or display in the towing vehicle to display and to alert the driver of the towing vehicle of the status of predetermined operating parameters of the towed vehicle when in tow wherein said towing vehicle module microcontroller is coupled to an external power source by a towing vehicle power supply and coupled to a towing vehicle control unit comprising a CAN network interface within the towing vehicle through a self-diagnostic device port and a towing vehicle control unit interface and said towed vehicle module microcontroller is coupled to an external power source by a towed vehicle power supply and coupled to a towed vehicle control unit comprising a CAN network interface within the towed vehicle through a self-diagnostic device port and a towed vehicle control unit interface further including a towing vehicle control panel comprising a display and control switches coupled to said microcontroller of the towing vehicle to transmit and receive data and control signals between said microcontroller of said towing vehicle and said towed vehicle module through a communication section coupled to said microcontroller of said towing vehicle and a towed vehicle control panel comprising a display coupled to said microcontroller of the towed vehicle to transmit and receive data and control signals from said microcontroller of the towed vehicle through a communication section to said communication section of the towing vehicle wherein said towing vehicle module includes an alarm to generate an audio and/or visual indication when at least one predetermined operating parameter of the towed vehicle is detected and further including a towed vehicle transceiver to transmit data signals from said towed vehicle module of the towed vehicle to a towing vehicle transceiver of said towing vehicle module and a brake and communication system to monitor and communicates the status of at least one of the predetermined operating parameters and wherein said at least one predetermined operating condition includes the level of battery charge, tire pressure, transmission temperature and braking events sensed by sensors associated with each of said sub-systems being monitored.

19. A brake and communication system to remotely control the braking of a towed vehicle from a towing vehicle comprising a towing vehicle module including a microcontroller having logic and circuitry to generate a braking signal in response to braking of said towing vehicle fed through an automotive vehicle self-diagnostic device port and vehicle control unit interface to the brake system of the towed vehicle and the towed vehicle including a microcontroller having logic and circuitry to generate a brake control signal fed to the brake system of the towed vehicle through a vehicle control unit interface and automotive self-diagnostic port to electronically actuate the towed vehicle brakes and to transfer data between the towing vehicle and the towed vehicle including information of selected vehicle control network operating parameters generated in the towed vehicle through said microcontroller to a remote monitor or display in the towing vehicle to display and to alert the driver of the towing vehicle of the status of predetermined operating parameters of the towed vehicle when in tow wherein said towing vehicle module microcontroller is coupled to an external power source by a towing vehicle power supply and coupled to a towing vehicle control unit comprising a CAN network interface within the towing vehicle through a self-diagnostic device port and a towing vehicle control unit interface and said towed vehicle module microcontroller is coupled to an external power source by a towed vehicle power supply and coupled to a towed vehicle control unit comprising a CAN network interface within the towed vehicle through a self-diagnostic device port and a towed vehicle control unit interface wherein said CAN network interface of said towing vehicle control unit comprises an OBD II port and said CAN network interface of said towed vehicle control unit comprises an OBD II port further including a towing vehicle control panel comprising a display and control switches coupled to said microcontroller of the towing vehicle to transmit and receive data and control signals between said microcontroller of said towing vehicle and said towed vehicle module through a communication section coupled to said microcontroller of the towing vehicle and a towed vehicle control panel comprising a display coupled to said microcontroller of the towed vehicle to transmit and receive data and control signals from said microcontroller of the towed vehicle through a communication section to said communication section of the towed vehicle wherein said towing vehicle module includes an audio and/or visual indicator when at least one predetermined operating parameter of the towed vehicle is detected and further including a towed vehicle transceiver to transmit data signals from said towed vehicle module of the towed vehicle to a towing vehicle transceiver of said towing vehicle module and a brake and communication system to monitor and communicate the status of at least one predetermined operating parameters and wherein when any of the predetermined operating parameters reaches a predetermined threshold value or metric a corresponding data signal is transmitted from said towed vehicle module to said towing vehicle module to be converted and displayed on said display and an alert is generated.

20. A brake and communication system to remotely control the braking of a towed vehicle from a towing vehicle comprising a towing vehicle module including a microcontroller having logic and circuitry to generate a braking signal in response to braking of said towing vehicle fed through an automotive vehicle self-diagnostic device port and vehicle control unit interface to the brake system of the towed vehicle and a towed vehicle module including a microcontroller having logic and circuitry to generate a brake control signal fed to the brake system of the towed vehicle through a vehicle control unit interface and automotive self-diagnostic port to electronically actuate the towed vehicle brakes and to transfer data between the towing vehicle and the towed vehicle including information of selected vehicle control network operating parameters generated in the towed vehicle through said microcontroller to a remote monitor or display in the towing vehicle to display and to alert the driver of the towing vehicle of the status of predetermined operating parameters of the towed vehicle when in tow wherein a brake and communication system monitors and communicates the status of at least one of the predetermined operating parameters and wherein at least one predetermined operating parameters comprises the level of battery charge, tire pressure, transmission temperature or barking events sensed by sensors associated with each of the predetermined operating parameters being monitored.

21. A brake and communication system to remotely control the braking of a towed vehicle from a towing vehicle comprising a towing vehicle module including a microcontroller having logic and circuitry to generate a braking signal in response to braking of said towing vehicle fed through an automotive vehicle self-diagnostic device port and vehicle control unit interface to the brake system of the towed vehicle and a towed vehicle module including a microcontroller having logic and circuitry to generate a brake control signal fed to the brake system of the towed vehicle through a vehicle control unit interface and automotive self-diagnostic port to electronically actuate the towed vehicle brakes and to transfer data between the towing vehicle and the towed vehicle including information of selected vehicle control network operating parameters generated in the towed vehicle through said microcontroller to a remote monitor or display in the towing vehicle to display and to alert the driver of the towing vehicle of the status of predetermined operating parameters of the towed vehicle when in tow wherein a brake and communication system monitors and communicates the status of at least one of the predetermined operating parameters and wherein when any of the predetermined operating parameters reaches a predetermined threshold value or metric a corresponding data signal is transmitted from said towed vehicle module to said towing vehicle module to be converted and displayed on said display and an alert is generated.

22. A brake communication system to remotely control the braking of a towed vehicle from a towing vehicle comprising a towing vehicle module including a microcontroller having logic and circuitry to generate a braking signal in response to braking of said towing vehicle fed through an automotive vehicle self-diagnostic device port and vehicle control unit interface to the brake system of the towed vehicle and the towed vehicle including a microcontroller having logic and circuitry to generate a brake control signal fed to the brake system of the towed vehicle through a vehicle control unit interface and automotive self-diagnostic port to electronically actuate the towed vehicle brakes and to transfer data between the towing vehicle and the towed vehicle including information of selected vehicle control network operating parameters generated in the towed vehicle through said microcontroller to a remote monitor or display in the towing vehicle to display and to alert the driver of the towing vehicle of the status of predetermined operating parameters of the towed vehicle when in tow wherein said towing vehicle module microcontroller is coupled to an external power source by a towing vehicle power supply and coupled to a towing vehicle control unit comprising a CAN network interface within the towing vehicle through a self-diagnostic device port and a towing vehicle control unit interface and said towed vehicle module microcontroller is coupled to an external power source by a towed vehicle power supply and coupled to a towed vehicle control unit comprising a CAN network interface within the towed vehicle through a self-diagnostic device port and a towed vehicle control unit interface further including a towing vehicle control panel comprising a display and control switches coupled to said microcontroller of the towing vehicle to transmit and receive data and control signals between said microcontroller of said towing vehicle and said towed vehicle module through a communication section coupled to said microcontroller of the towing vehicle and a towed vehicle control panel comprising a display coupled to said microcontroller of the towed vehicle to transmit and receive data and control signals from said microcontroller of the towed vehicle through a communication section to said communication section of the towed vehicle wherein said towing vehicle module includes an audio and/or visual indicator when at least one predetermined operating parameter of the towed vehicle is detected and further including a towed vehicle transceiver to transmit data signals from said towed vehicle module of the towed vehicle to a towing vehicle transceiver of said towing vehicle module and a brake and communication system to monitor and communicate the status of at least one predetermined operating parameters and a brake and communication system to monitor and communicates the status of at least one of the predetermined operating parameters and wherein said at least one predetermined operating condition includes the level of battery charge, tire pressure, transmission temperature and braking events sensed by sensors associated with each of said sub-systems being monitored.

* * * * *